United States Patent [19]
Schade, III

[11] Patent Number: 6,094,602
[45] Date of Patent: Jul. 25, 2000

[54] METHOD AND APPARATUS FOR ESTIMATING AND CONTROLLING NON-LINEAR DISTURBANCES IN A FEEDBACK CONTROL SYSTEM

[75] Inventor: William John Schade, III, Fort Collins, Colo.

[73] Assignee: Woodward Governor Company, Loveland, Colo.

[21] Appl. No.: 08/980,031

[22] Filed: Nov. 26, 1997

Related U.S. Application Data

[60] Provisional application No. 60/031,526, Nov. 29, 1996.

[51] Int. Cl.[7] .................................................. G05B 13/04
[52] U.S. Cl. ............................. 700/45; 700/29; 700/30; 700/44
[58] Field of Search .............................. 700/29, 30, 45, 700/193, 44

[56] References Cited

U.S. PATENT DOCUMENTS

| | | | |
|---|---|---|---|
| 4,038,531 | 7/1977 | Loe, Jr. ....................................... | 700/30 |
| 4,679,136 | 7/1987 | Shigemasa ................................. | 700/30 |
| 5,115,418 | 5/1992 | Shimada .................................... | 318/616 |
| 5,274,314 | 12/1993 | Maqueira ................................... | 318/632 |
| 5,374,884 | 12/1994 | Koren et al. .............................. | 700/193 |
| 5,532,565 | 7/1996 | Vervoordeldonk .......................... | 700/29 |
| 5,557,555 | 9/1996 | Friot et al. ................................. | 700/45 |

FOREIGN PATENT DOCUMENTS

WO 95/27930  10/1995  Germany .

OTHER PUBLICATIONS

Proceedings of the 1993 American Control Conference, vol. 2 of 3, publication date Jun. 2, 1993, entitled "Model Reference Position Control of an Elastic Two–Mass System with Compensation of Coulomb Friction".

Example Applications Of The Linear Adaptive Design Technique, C.D. Johnson, 1989: International Journal of Adaptive Control and Signal Processing, vol. 3, 111–129 (1989).

*Primary Examiner*—William Grant
*Assistant Examiner*—Kidest Bahta
*Attorney, Agent, or Firm*—Leydig, Voit & Mayer, Ltd.

[57] ABSTRACT

A feedback control system which includes a disturbance estimator and controller which takes account of and corrects for non-linear disturbances. A simple state model representative of the controlled plant is provided. A plant controller responds to a command signal and a process feedback signal for producing a controller output. The controller output drives both the plant and the state model. A sensed signal representing a state of the plant is compared with a corresponding output state of the model to produce an error signal which is representative of disturbances applied to the system. The disturbance estimator and controller responds to the error signal to produce a disturbance control output which is adapted to compensate for the non-linear disturbance. In a preferred embodiment the plant is an actuator and the non-linear disturbances are friction related. The disturbance control output in the preferred embodiment has an initial constant magnitude summed with an increasing ramp, and the disturbance estimator senses polarity reversals in the error signal to reverse the polarity of at least the constant component of the disturbance output.

26 Claims, 6 Drawing Sheets

METHOD AND APPARATUS FOR ESTIMATING AND CONTROLLING NON-LINEAR DISTURBANCES IN A FEEDBACK CONTROL SYSTEM

RELATED APPLICATION

This application claims the benefit of U.S. Provisional Application Serial No. 60/031,526, filed Nov. 29, 1996.

FIELD OF THE INVENTION

This invention relates to closed loop feedback control systems, and more particularly to control systems adapted to take account of "disturbances", particularly non-linear disturbances.

BACKGROUND OF THE INVENTION

Feedback control systems are well known and have many practical uses. They can be very simple, or they can be quite sophisticated and complex. Many have analog or digital computers used to perform the control function, have sensors for sensing process or plant conditions, and have outputs for controlling the process or plant. Most broadly, a feedback control system can be thought of as having a command input, a feedback (or plant) input, control elements for sensing the relationship between command and the feedback signals and producing a controller output in accordance with the error between those signals, for controlling the process. Feedback control systems can be as simple as the thermostat in a home heating system. In the automobile both the cruise control and the anti-lock braking system can include closed loop feedback control systems.

The present invention deals with reasonably sophisticated control systems which, in addition to responding to command and feedback signals to produce a controller output as a result of differences between the command and feedback signals, are subjected to and are intended to compensate for non-linear "disturbances". A significant application for such control systems is for fuel control valves (or injector valves) for large industrial engines, such as turbines or multiple cylinder internal combustion engines. In such systems an actuator position is controlled to a particular point to allow fuel to flow at a particular rate, and the feedback system will sense an engine parameter (such as RPM, for example) and compare that with an input command signal to maintain the position of the actuator at a point which will minimize the error signal. Most often, except for transient conditions, the valve is stationary. If an adjustment is required the control system must produce a signal to drive the valve to its new position. However, friction comes into play, and it is known that before the valve begins to move, a force must be applied which is adequate to overcome static friction. That force is typically significantly greater than the force it would take to simply move the valve to its new position if friction were not present. Sliding friction forces must also be overcome when the valve is moving. It is these types of friction effects which can be considered non-linear disturbances in this example.

It will be noted at this point that friction is not universally considered to be a disturbance by all. However, in feedback control system such as those disclosed in the present application, it is a useful concept for control purposes. Accordingly, friction will be treated as a disturbance, and in the preferred embodiment, the disturbance of interest in this application.

Those skilled in the art will appreciate that the disturbance signal can be ignored and ultimately with a properly configured control loop, the control and feedback signals will ultimately drive the system to the desired position, but commonly with limit cycles due to friction. However, that is only acceptable in system which can tolerate slow response times. When a highly responsive control, which has a fast response time and resulting high bandwidth is required, it is not acceptable to simply ignore the disturbance signal and allow the disturbance to be subsumed in the control. That will typically lengthen response times to beyond acceptable limits. Instead, steps must be taken to somehow compensate or make provision for the expected non-linear disturbance. This is preferably done in a way which does not hinder overall system performance and response time, and also in a way which does not detrimentally affect the stability of the system.

In the past, "dither" techniques have been used in an effort to deal with disturbances such as these. A dither signal is a noise signal, e.g. a square wave or pulse signal which is injected into the system in an effort to "overpower" the disturbance signal, and thus its effect. The magnitude of the dither signal is great enough to overcome the friction. The effect of the dither is to continuously oscillate the output signal so that the actuator is being driven (only a minuscule amount) in one direction or the other, such that if an error signal requiring valve movement is produced by the controller, the dither will have already overcome static friction. This technique has a number of disadvantages. The dither is, of course, non-adaptive, and thus the magnitude must be set to a level higher than the largest disturbance intended to be encountered. In the friction example, it must be set higher than the highest level of friction which the system is expected to encounter. Furthermore, friction is a varying non-linear force, and the dither does not have the ability to adapt to the differing friction levels. Consequently, the use of a dither approach may provide too much or too little force to overcome the frictional forces. In addition, the dither reduces system robustness, through excitation of system resonances, or by making the control response less determinant.

Suggestions have been made as to adaptive ways of handling disturbances when disturbances are of the linear variety. However, when the disturbances become non-linear, resort has been had to other techniques, such as the use of the dither, in order to approach acceptable system response times and steady state performance.

SUMMARY OF THE INVENTION

In view of the foregoing, it is a general aim of the present invention to provide a feedback control systems which estimates and accounts for non-linear system disturbances, as opposed to simply attempting to overpower the non-linear disturbances.

In accomplishing that aim, it is an objective of the present invention to provide a control system having an estimator or observer to determine the onset of a non-linear disturbance, and to provide an output signal of a magnitude able to compensate for the non-linear disturbance.

In an particular implementation, it is an object to provide a control system for use with an actuator which takes account of non-linear disturbances in the actuator, including static and sliding friction, and, upon the occurrence of such disturbances, to modify the control signal to account for and minimize the effect of such disturbances.

It is a resulting object to provide a closed loop feedback control system which is highly responsive, which enhances its response time by estimating for and controlling nonlinear disturbances, and which accomplishes that in a way which does not adversely impact system robustness or stability.

In a certain respect, it can be considered an object of the present invention to provide the effect of an adaptive dither for certain types of control systems.

In accomplishing these aims and objectives, the present invention provides a system and corresponding method which accomplishes closed loop control of a plant in which a plant controller responds to command inputs and feedback inputs for producing a controller output, and which takes account of non-linear disturbances in a particularly effective way. A state model is provided which is broadly representative of the plant, and which is driven by the controller output. A comparator compares a signal representative of an operating condition of the plant with a corresponding operating condition of the state model to produce an error signal representative of the differences. For example, a position signal from the plant and a state output from model representative of position are compared to detect differences between the plant and the model. A disturbance estimator and controller is responsive to the error signal, for producing a disturbance controller output signal which is of a predetermined magnitude is based on known non-linear characteristics of the disturbance. Means are provided for coupling the disturbance controller output as a supplemental input to the plant to compensate for the non-linear disturbance.

In the particular situation where the disturbance of interest is friction, the disturbance estimator and controller produces a two level output including a first constant component which is slightly less in magnitude than the minimum level disturbance known to exist in the system. A second component is a ramp added to the constant component so that the sum of those signals quickly causes the system to progress through the non-linear disturbance. The error signal indicates such as by reversing polarity, the point at which the output progresses through the disturbance whereupon the disturbance controller output also reverses.

It is a feature of the invention that the disturbance estimator and controller adds a compensating signal to the plant control signal of a magnitude adequate to compensate for non-linear disturbances, and which continues to reverse polarity about a control point. The system is configured in a preferred embodiment to produce a very small limit cycle on the actuator output so that frictional effects are readily overcome but without the detrimental result of excessive wear and motion on the actuator.

It is a further feature of the invention that a very stable and linear control can be provided and which is overlaid with a non-linear disturbance estimator and controller in a way which does not affect the robustness of the underlying linear control.

According to certain aspects of the invention, it is a feature that the basic plant control is optimized for plant conditions, and the non-linear disturbance estimator and controller is configured to account for very small actuator movements and very small errors introduced by non-linear disturbances without affecting the overall robustness of the basic plant control loop.

Other objects and advantages of the invention will become more apparent from the following detailed description when taken in conjunction with the accompanying drawings.

DETAILED DESCRIPTION OF THE PREFERRED EMBODIMENT

The present invention will be described specifically in the context of a feedback control system for an actuator in which the non-linear disturbance to be compensated are the friction forces associated with the actuator. However, the description will also characterize the invention more broadly as adaptable to feedback control systems in general which are subject to non-linear disturbances, and in which means are provided for estimating and controlling the effect of such non-linear disturbances. Thus, while the actuator implementation is the currently preferred embodiment, it is believed that the invention has broader aspect, and it is the intention to cover all alternatives and modifications of the present invention, both narrowly and broadly, as are encompassed within the spirit and scope of the invention as defined by the appended claims.

Figure 1:
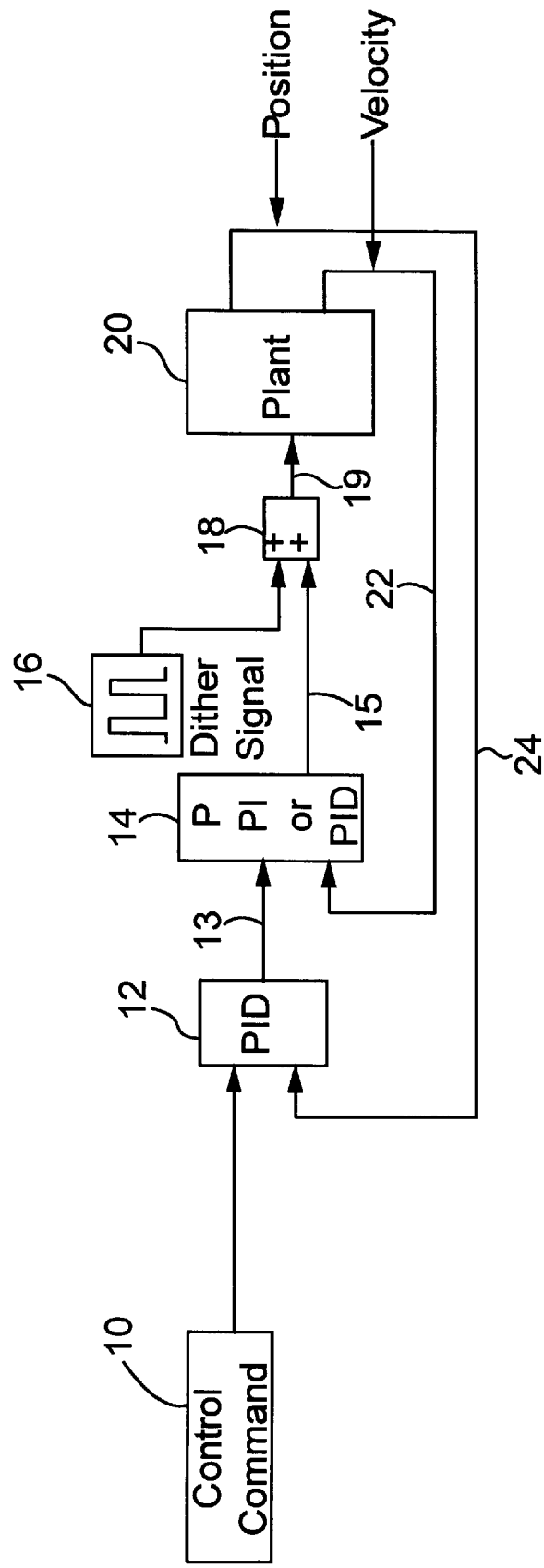
FIG. 1 is a schematic block diagram representation of a conventional PID feedback control system with a dither module to overcome disturbances.

Turning then to the drawings, in order to provide context for the present invention FIG. 1 illustrates a schematic block diagram of an actuator using a conventional PID control, with a dither to overcome friction forces. According to this conventional design, a control command input 10, for example a position command signal, is connected as an input to a standard proportional, integral, and derivative (PID) controller 12. Following standard feedback control techniques, the PID controller 12 also has a feedback signal relating to the actuator position as a feedback input on line 24. The output 13 of the PID controller 12 is coupled to a P, PI, or PID controller 14 depending on system performance criteria and characteristics. The P, PI, or PID controller 14 also has a feedback signal, in this case relating to the actuator velocity, as an input on line 22.

In an ideal world, i.e., one without disturbances such as friction, the output 15 of the P, PI, or PID controller 14 would directly be coupled to the system plant 20 to drive the actuator to the desired position. In real world implementations of feedback control systems, however, disturbances such as friction are always present and interfere with system performance. To provide sufficient force to overcome the friction forces acting on the system, a dither signal source 16 produces a dither signal which is added to the signal 15 in a summer 18, and the resulting signal 19 is the one that is coupled to the plant 20.

The overcoming of friction including static friction can be conceptualized in the following terms. Assume that the command signal and feedback signal are such that a change in the output is required, and the system is a high performance system with fast demanded response time. The mismatch in command and feedback signals will produce an error signal of a given magnitude. If the system is already moving in the direction demanded by the error signal, the error signal will be capable of driving the plant within the design parameters of the systems to the newly required position. However, if the plant is at rest, and static friction or some other disturbance is a factor, the error signal will not be of sufficient magnitude to drive the plant to the new position within the required response time. Response and limit cycle will thus be much more sluggish, and a major part of the reason is the friction or the disturbance. In the case where it is necessary to overcome static friction in order to get the system in motion, the dither approach has utilized a dither signal to keep the system just over the edge of movement in order to compensate for static friction. If the motion is too great, the plant (for example the actuator and its seals and bearings) can be subjected to excessive wear, and oscillations, and system performance might also be compromised. If the dither signal is not of great enough magnitude, part of the disturbance will not be overcome. In any event, it is difficult to achieve and maintain a consistent level which will provide the desired performance, and the systems are generally a compromise, often less than satisfactory.

There are many reasons why a dither is not an ideal solution to controlling disturbances such as friction. First, friction is a varying, nonlinear force. The dither signal, however, is usually a constant square wave or pulse type signal. Because the dither is non-adaptive, at various times it may provide too much or too little force to overcome friction. Further, the dither reduces system robustness. As a result, the system loses the ability to perform consistently despite changing parameter values, e.g., friction, applied voltage, flow forces, etc.

Figure 2:
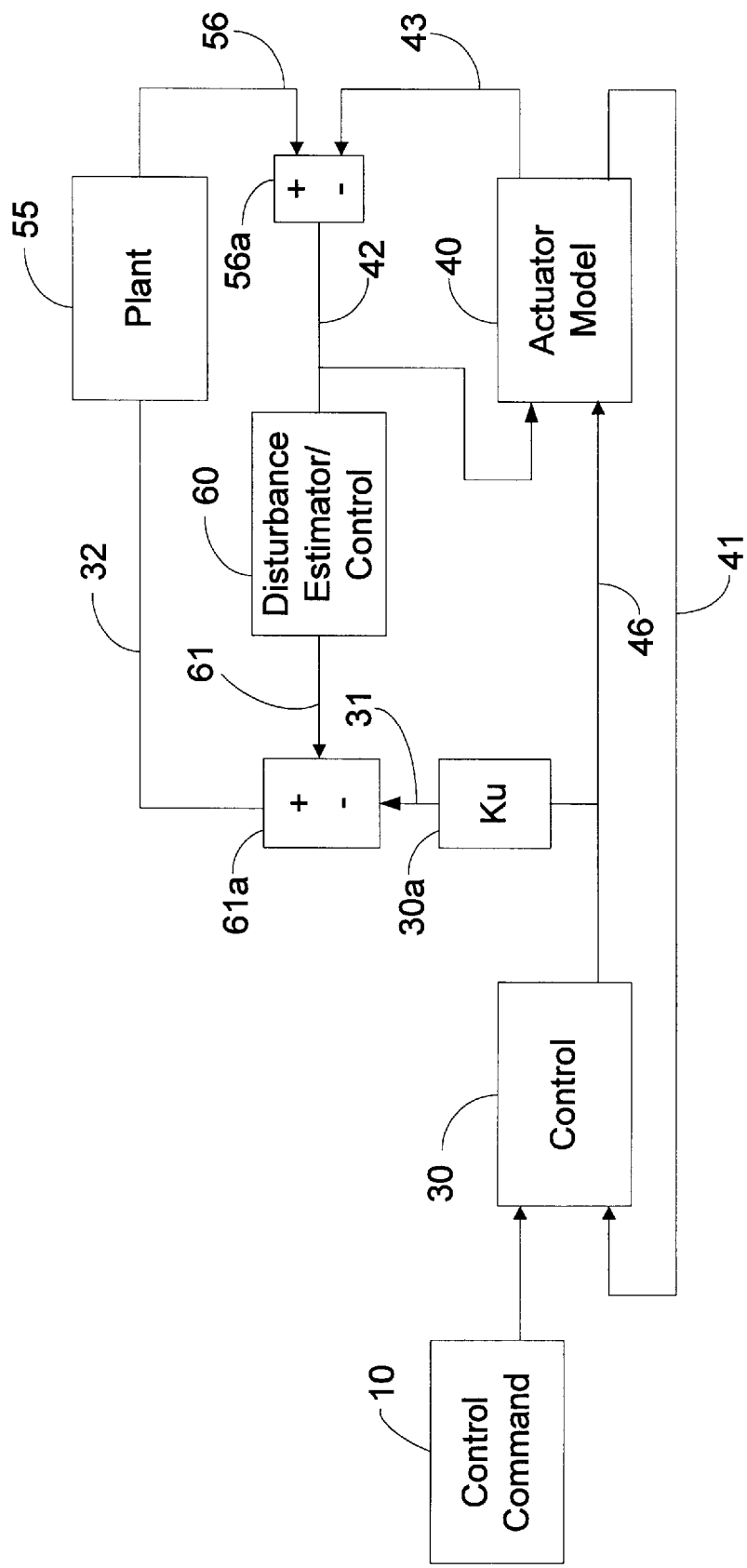
FIG. 2 is a block diagram representation of a feedback control system implementing the disturbance estimator and controller according to the invention.

FIG. 2 is a block diagram of a control system for an actuator, the system incorporating a disturbance estimator and controller according to the invention. In contrast to a PID-based control, as in FIG. 1, FIG. 2 illustrates the use of a state space controller. A control command 10 is provided which is a source of command signals for the controller. In the case of the actuator, the command signal will typically be a position command. The position command is coupled to a controller 30. The controller 30 also has a feedback signal provided on line 41. In this case, however, the feedback signal is from a model 40, rather than from the plant itself.

In carrying out the invention, an actuator model 40 is provided which broadly can be characterized as a state model of the system or plant to provide output signals which are estimates of the states of the systems. In the present instance, the output 41 taken from the model 40 is intended to be position output, which is coupled back to the controller 30 for comparison with the position command signal 10 to produce a controller output signal 46.

In the FIG. 2 implementation, the controller output signal 46 directly drives the actuator model 40 and by means of a scaling element 30a produces an output signal 31 which is coupled to the plant 55 as a main controller output signal for the plant. Thus, and ignoring the disturbance estimator and controller elements for the moment, the main control 30 responds to control commands for module 10 and feedback signals on line 41 to produce a controller output signal on line 46 which controls the position of the plant 55. In the present example, the plant 55 is the actuator, and it is the position of the actuator which is controlled.

In accordance with the invention, an output of the plant 55 and state output of the actuator model 40 are compared in a comparator 56a to produce an error signal on line 42. The position signal on line 56 is typically taken from a transducer (such as a synchro) which measures actuator position, and thus is an actual measure of the controlled output. The signal on line 43 is an estimate of the position state taken from the model 40. Differences between those signals can be attributed to disturbances such as friction, and the polarity and magnitude of the signal on line 42 can be sensed to estimate the presence of a disturbance and to control for its effect. To that end, and in accordance with the invention, a disturbance estimator/controller 60 is coupled to the comparator 56a to sense the signal on line 42 and to provide an output signal adapted to compensate for the disturbance. The output signal is provided on line 61 and is combined with the controller output on line 31 in summer 61a to produce an output signal 32 which drives the plant 55.

The output signal and line 61 is not a linear function of the error signal on line 42, nor is it a function which varies linearly with respect to time. Instead, the signal produced by the controller 60 is adapted to compensate for the non-linear characteristics of the disturbances. As will be described below, in a currently preferred embodiment of the invention, the disturbance output signal 60 is in the form of a two level signal including a step function having a magnitude which is slightly less than the smallest disturbance expected to be encountered, summed with a ramp signal of a magnitude adapted to progress through the disturbance level. The interconnection of the elements as illustrated in FIG. 2 is adapted to continuously monitor the error signal which is a measure of the difference between the plant 55 and the actuator state model 40, and to reverse polarity as the output signal from the disturbance controller the disturbance signal. Upon reversal of polarity, the disturbance estimator and controller will drive the system in the other direction until the comparator again senses that one has passed the other. The system will continue to alternate conditions in this fashion, and the parameters are such that the movement about a steady state point is very small, and within a tolerable limit cycle.

The disturbance estimator and controller 60 uses the error signal on line 42 to estimate the disturbance acting on the system, and to generate the force necessary to counteract the disturbance. The error signal is determined by comparing the actuator position signal on line 56 from and the model actuator position state on line 43. The counterforce generated by the disturbance estimator and controller 60 is added to the compensator signal 31 to generate a control signal 32. Control signal 32 is the signal that drives the actuator 55.

In the FIG. 2 implementation, the composite signal 32 which includes both a controller input and a disturbance estimator/controller input drive the plant 55, but only the controller signal 46 is coupled to the model 40. In order to assist the model 40 in following the actuator 55, the error signal 42 which is derived from the comparator 56a is also connected as an input to the actuator model 40. The specific manner in which this can be accomplished is described below. For the moment, it is adequate to understand that the connection of the error signal to the model assists the model in the following the plant and thus to assist the overall control.

Figure 3:
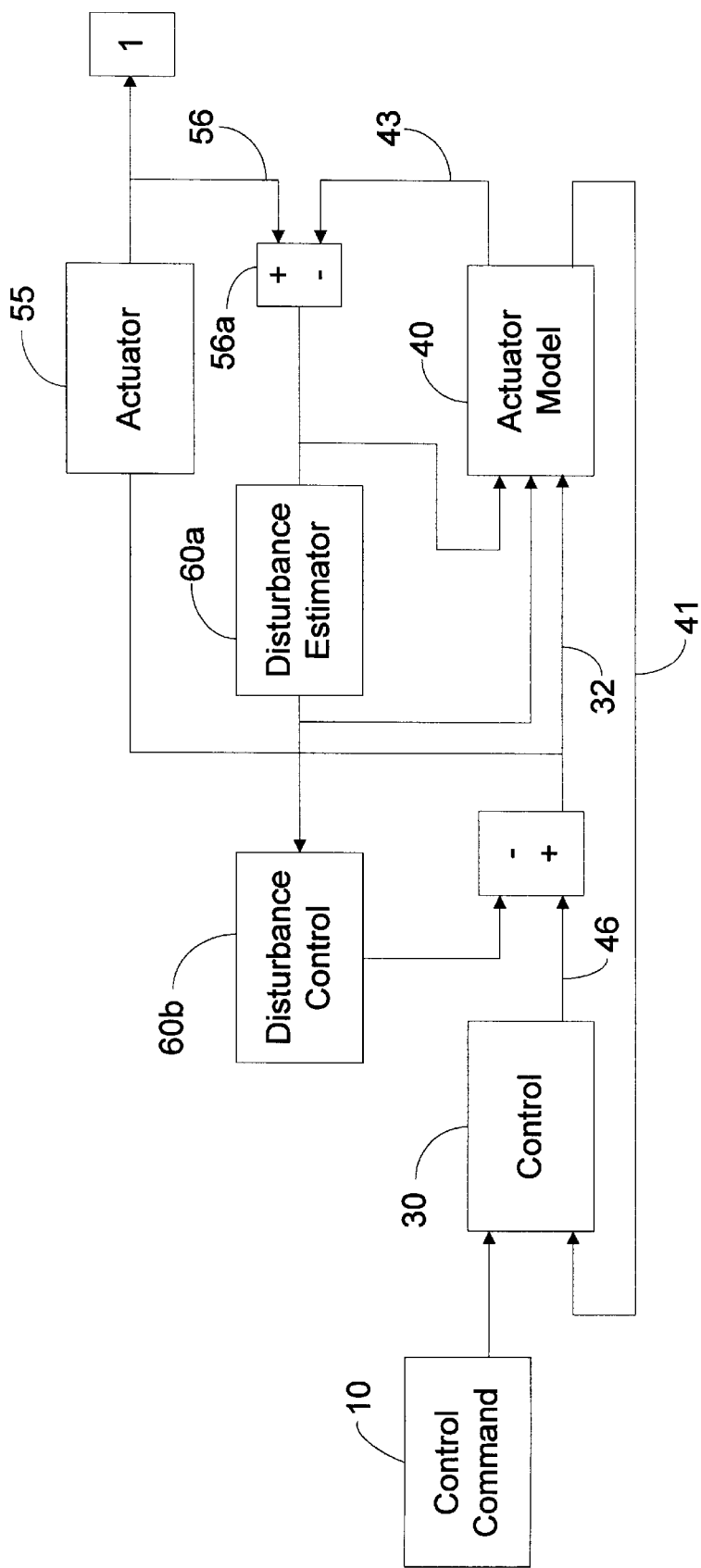
FIG. 3 is a block diagram, similar to FIG. 2, but illustrating an alternative implementation of the present invention, showing a different connection of a disturbance estimator and controller in a control system, and illustrative of the breadth of the present invention.

Turning now to FIG. 3, there is shown an alternative implementation of the invention, at about the same level of detail as FIG. 2. FIG. 3 illustrates a separate disturbance estimator and disturbance control, and their interrelationship to the remainder of the system. As in the FIG. 3 implementation, a main controller 30 has inputs from a control command module 10 and an actuator model 40 including a system state signal on line 41, typically representative of position. The controller 30 produces an output signal 46 which, in this instance is passed through a summer to produce a composite signal on line 32 which drives both the actuator model 40 and the actuator 55. A plant feedback signal on line 56 and a model state feedback signal on line 43 are coupled to a comparator 56a to produce an error signal 42. As in the prior embodiment, the error signal 42 is a measure of the disturbance, and is coupled to the input of the disturbance estimator and controller. However, in the present case the disturbance estimator and disturbance controller are separate elements. The disturbance estimator is illustrated as block 60a, and provides an output signal which is coupled to the disturbance controller 60b and also coupled to the actuator model 40. The disturbance estimator, the in the case of certain actuators, can consist of simply a comparator and an integrator adapted to mimic friction effects. The integrated output signal is then passed to the disturbance controller 60b which produces an output signal coupled to the summer for supplementation of the controller signal 46 so as to overcome the disturbance. The composite signal on line 32, in this case is coupled to drive both the model 40 and the actuator 55.

In certain cases the disturbance estimator 60a and controller 60b can be combined into a single module. This is particularly the case when the front end dynamics can be approximated by a simple function, such as a constant, in which case the estimator and the controller become the same elements. However, as illustrated in FIG. 3, when the estimator is a more complex element, separate estimator and controller modules can be provided to accomplish the aims of the present invention.

Figure 5:
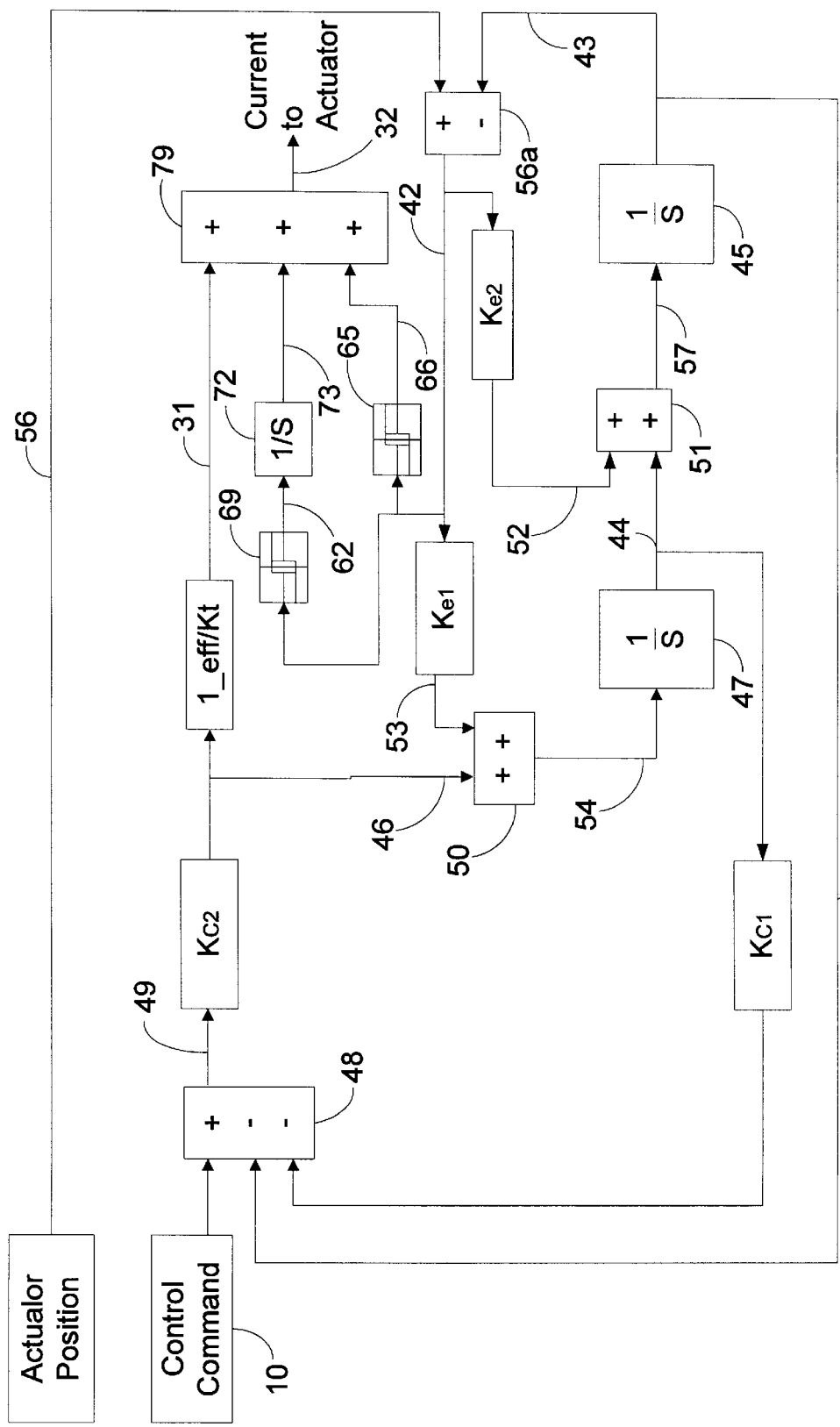
FIG. 5 is a schematic block diagram representation of a disturbance estimator and controller according to the invention.
Figure 6:
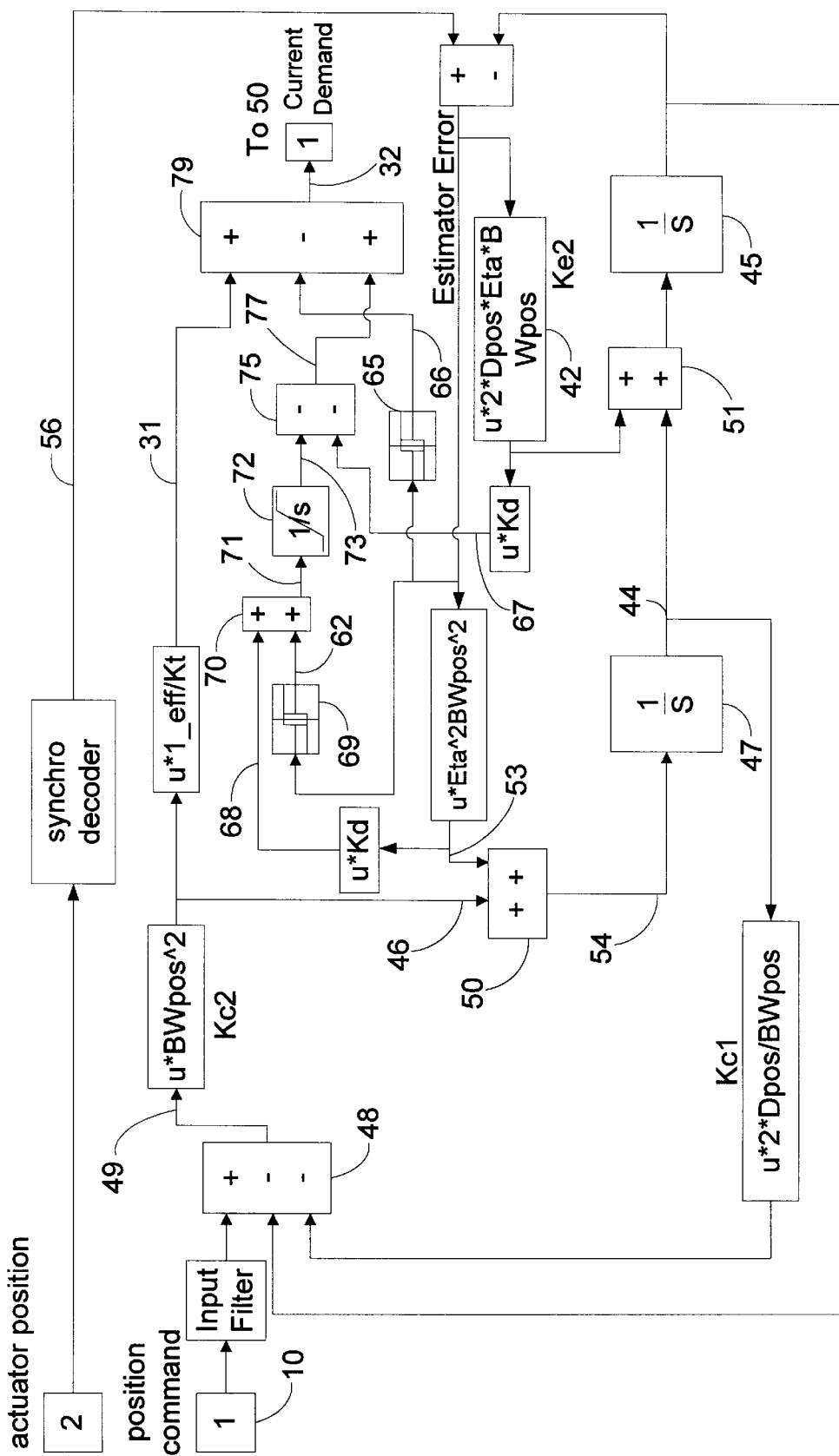
FIG. 6 is a schematic block diagram representation of a more complex disturbance estimator and controller according to the invention.

Particular forms of the disturbance estimator and controller of the invention are discussed more particularly in reference to FIGS. 5 and 6. To utilize the disturbance estimator and controller of the invention, one first needs to design and build a model of the system in question. A very simplified state model is usually adequate, as will be described below. The system model is then used to obtain system states and to compare actual system performance to the model performance.

Referring to FIG. 3, in the present embodiment of the invention, the actuator 55 can be adequately modeled and represented by a second order state diagram. The actuator model 40 includes two serially connected integrators 47 and 45. Feedback signals on lines 44 and 43 represent velocity and position states, respectively. It will thus be appreciated the state model 40 is a rather simple implementation, and only roughly characterizes the state of the system. However, when used as taught the present specification, the model 40 is adequate to provide a sufficient indication of actuator states to be used with the control system and with the disturbance estimator and controller to provide precise feedback control of the actuator.

The remaining elements illustrated in FIG. 3 are representative of the control elements. The summer 48 combines the command signal 10, the position feedback signal from the model on line 43 and, in the present case, a scaled function of the velocity state on line 44. The output signal 49 of the summer 48 operates through a gain element 49a to produce an output signal on line 46 which drives both the model 40 and the plant (not illustrated in FIG. 3). The gains are determined in part by normalization, and in part by the desired dynamics of the system. For example in FIG. 3, the gain $K_{c1}$ and $K_{c2}$ establish the system dynamics. For example, $K_{c1}$ and $K_{c2}$ are determined from an evaluation of the expression:

$$G(s)=1/(S^2/K_{c2}+S*K_{c1}+1)$$

Figure 4:
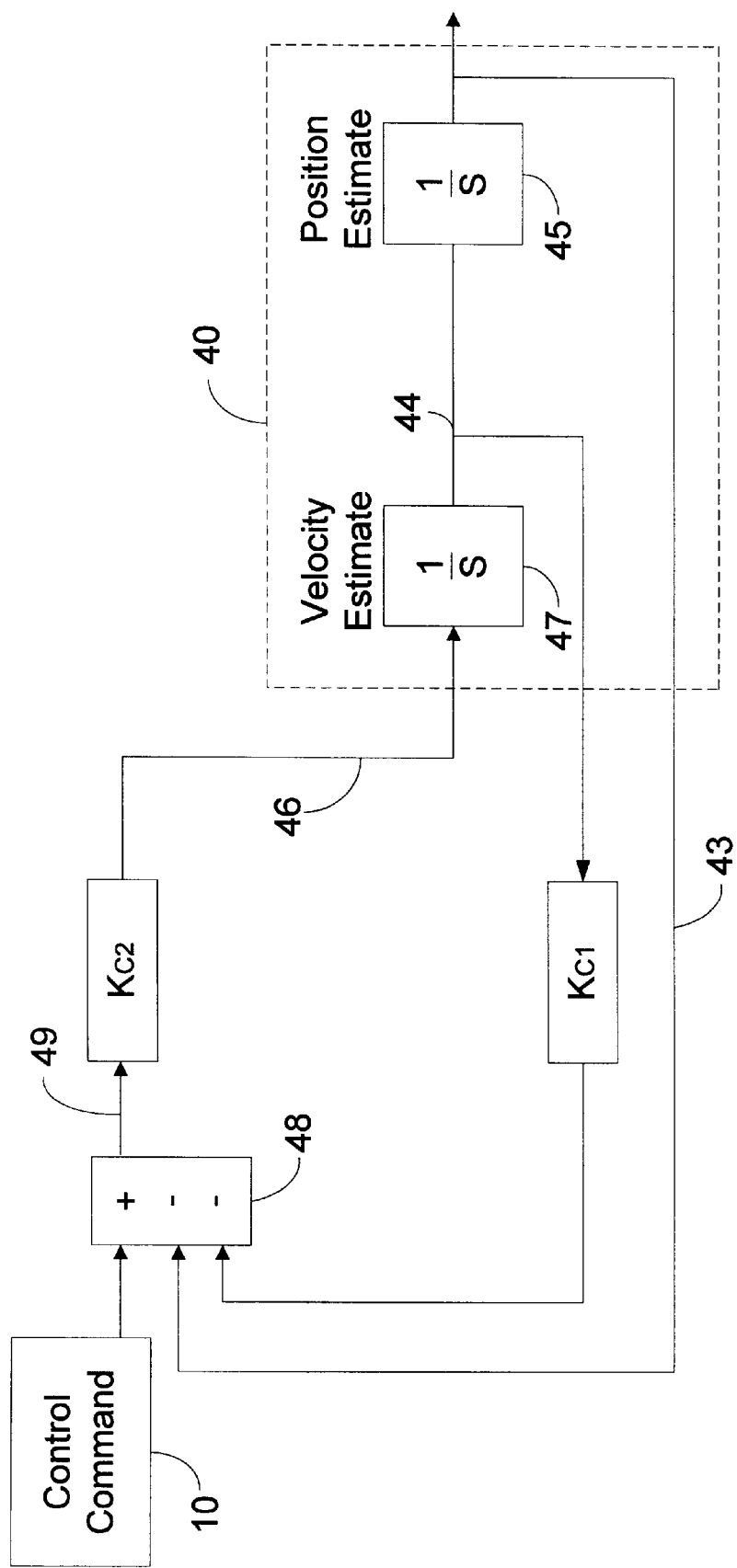
FIG. 4 is a second order state model of an actuator system with control.

With that as background, and turning now to FIG. 4, there is shown a simplified implementation of a control system constructed in accordance with the present invention. An actuator model 40 is provided which includes integrators 47 and 45 connected to provide a simple state model of the system. In order to render that model somewhat more representative of the system, the input signals through the integrators 47 and 45 are supplemented as described below. Thus, as shown in FIG. 5, instead of directly connecting the controller command on line 46 into the first integrator 47, that signal is supplemented is by a signal on line 53 taken from the error comparator 56a. A signal 53 is summed with the signal 46 in a summer 50 to produce an output signal on line 54 which serves as an input for the first integrator 47. The signal on line 53, in turn, is representative of the error signal on line 42 multiplied by a gain constant $K_{e1}$. The gain $K_{e1}$ is explicitly determined by establishing position bandwidth. Indeed, FIG. 6 illustrates both the general constants and the more detailed elements which determine the constants. One of ordinary skill in the art will readily appreciate how one determines the constants based on the bandwidth and factors specified above.

As a further refinement of the system of FIG. 5, instead of driving the second integrator 45 in the model from the output of the velocity determining integrator 47, the input signal 44 is supplemented by a further signal 52 taken from the plant. Thus, a summer 51 receives signal 44 from the integrator 47 and a further signal on line 52 from a gain element 52a which has the error signal 42 as an input. The gain $Ke_2$ of the element 52a is explicitly determined based on the same variables and methods as the gain $K_{e1}$. In this manner, the actuator model 40 is made to more accurately predict the operation and states (e.g., velocity and position) of the actuator 55.

One embodiment of the disturbance estimator and controller 60 of the invention will now be discussed in greater detail. In the illustrated embodiment, use is made of hysteresis switches 69, 65 for providing current signals which are summed with the controller output to produce a composite drive for the plant. Those switches are used in combination with a disturbance integrator 72 and when utilized as described will tend to produce enough force to overcome friction as quickly as possible but without adversely effecting system performance. The output of hysteresis switch 65 serves as a direct input to a summer 75 which provides a composite signal on the output line 32 which is connected to the actuator for driving the actuator. The error signal also triggers a second hysteresis switch 69 which drives an integrator 72 to produce a ramp signal which supplements the disturbance control signal on line 66. The effect is to produce a composite signal which is summed with the controller signal 31 to overcome the disturbance.

The hysteresis switches 65, 69 produce output signals which are of a predetermined magnitude and independent of the magnitude of the input error signal 42. Thus, when the error signals switches to a particular polarity the hysteresis switch 65 will produce an output signal of a given magnitude. In the illustrated embodiment, the output signal of the switch 65 is of a constant level and having a magnitude which is just very slightly less than the minimum disturbance known to exist in the system. That step function is supplemented by a ramp produced through the hysteresis switch 69 and disturbance integrator 72. The ramp adds an increasing ramping signal to the constant signal 65 which will quickly push the composite signal through the disturbance. As a result, the current signal 32 which is coupled to the actuator has three components—the main controller component on line 31, the minimum valve set magnitude on line 66 and a ramp signal on line 73 which will combine to compensate for the disturbance. The disturbance is "estimated" in the sense that the output of the plant and the output of the model are continually monitored by the comparator 56a and when the plant signal passes the signal from the model, the reversal will be determined by the comparator 56a which will reverse the polarity of the error signal 42. That will be immediately sensed by the hysteresis switches 65, 69 which will change their polarity and attempt to drive the actuator in the other direction. This alteration of the polarity of the error signal on line 41 and the polarity disturbance control signal coupled to the summer 79 will continue. The gains are such that the movement about an established point is very small, although the magnitude of the disturbance control signal is adequate to push the system through the disturbance.

The degree of "oscillation" about a stable point is sometimes characterized as a "limit cycle". It is a general design and performance goal of feedback control systems to minimize the limit cycle, or at least maintain it within an acceptable zone. What is considered an acceptable zone depends on the system. For example, with the GS10 and GS25 actuators (see below), the seals of the actuator are capable of a certain amount of flex. If the limit cycle of the actuator can be maintained within the flex region of the seals, then the wear and tear on these actuator components will be minimized and the actuator life is extended. Similarly, minimizing actuator movement about the steady state output minimizes wear and tear on other actuator components, e.g. the actuator bearings. Maintaining an exceptionally small limit cycle (commonly in the range of 0.02°) will tend to minimize actual error movement occasioned by the disturbance estimator and control system, so as not to adversely wear seals or bearings of the actuator. At the same time, when movement of the actuator is desired, the of friction disturbance is readily accounted for in a highly responsive and accurate result.

As discussed in detail below, the hysteresis switch 65 produces a constant force component 66, and the integrator 72 produces a force component 73 in the form of a ramp. Force components 66 and 73 are added to the compensator signal 31 at summation point 79 to obtain the control signal 32 which is inputted into the actuator 55 (not shown).

Control signal 32 will have sufficient current to overcome friction forces and drive the actuator 55 to the desired location. Because of the ramp force component 73, however, the control signal 32 will eventually have too much current and cause the actuator to slightly overshoot the desired steady state location. Once the actuator 55 (not shown) has passed the desired location, however, the sign of the error signal 42 changes. When the sign of the error signal 42 changes, the sign of the output of the hysteresis switches 69 and 65 will also change, causing the force components 66 and 73 to be exerted in the opposite direction. The actuator will then be driven in the opposite direction to reach the desired steady state location. Because of the ramp force component 73, however, the actuator will once again slightly overshoot the desired steady state location. The overshoot will cause the sign of the error signal 42 to change again, and the actuator will be driven in the opposite direction. Because of the ability of the hysteresis switches 69 and 65 to almost instantaneously change the sign of their output, the actuator will oscillate within an acceptable zone about the desired steady state location (i.e., a limit cycle). The disturbance estimator and controller of the invention can maintain this limit cycle at very small values.

In many feedback control systems, especially actuators, there will always exist a certain minimum amount of friction. The friction forces may be greater than this minimum amount, but they will never be less. Because this minimal amount of friction needs to be overcome every time the actuator moves, it is desirable to provide a counterforce to overcome this minimum amount of friction as quickly as possible. The hysteresis switch 65 provides this immediate counterforce. Depending on whether the sign of the error signal is positive or negative, the hysteresis switch 65 outputs a positive or negative constant current signal 66 to overcome the minimum amount of friction. The minimum amount of friction that is always present in the system is determined through experimentation. It must be noted that the outputs of the hysteresis switches 65 and 69 are always constant for any given feedback system.

As stated above, often the friction forces acting on the system are greater than the minimum amount known to be always present. Accordingly, the invention also uses the hysteresis switch 69 in conjunction with the disturbance integrator 72 to provide the remaining force component necessary to overcome the friction forces actually present in the system.

The error signal on line 42 is connected as an input to the hysteresis switch 69. Similar to hysteresis switch 65, hysteresis switch 69 outputs a positive or negative constant current 62, depending on whether the sign of the error signal 42 is positive or negative. The output 62 of the hysteresis switch 69 is used as the input of the integrator 72. The output of the integrator 72 is a current ramp 73 that, when added to the constant current produced by the hysteresis switch 65, provides sufficient current, i.e., force, to push the actuator as quickly as possible through the friction actually present in the system.

The output 62 of the hysteresis switch 69 is connected as an input to the integrator 72 to reduce the time necessary for the integrator 72 to produce the amount of current needed to overcome friction. The integrator rate must be low enough to avoid oscillations caused by current control mode changes, yet high enough to avoid dropping the small signal bandwidth. In addition, the integrator rate must be less than the value which would cause current driver saturation mode oscillation.

By using a hysteresis switch output as the input into the integrator, rather than the error signal 42, the integrator 72 can integrate at a constant fast rate even if the magnitude of the error signal is very small which allows maintenance of small signal bandwidth. For example, if the input of the integrator was the error signal, and the error signal was small at the time the actuator needed to overcome a large friction force, it would take the integrator a long time to produce the amount of force needed to push through the friction. By using the hysteresis switch 69, however, the integrator 72 can always be integrated quickly, regardless of the magnitude of the error signal.

In certain applications, e.g., the GS10 or GS25 actuators manufactured by the Woodward Governor Company of Rockford, Ill., the maximum rate of integration must be kept below a certain limit to avoid adverse effects such as voltage saturation and bandwidth loss. In these actuators, the maximum rate of integration is a function of actuator inductance. The higher the inductance, the lower the maximum rate of integration needs to be. Otherwise, the actuators will suffer from voltage saturation. In other actuators or applications, however, it may be unnecessary to limit the maximum rate of integration.

The constant force component 66, generated by the hysteresis switch 65, and the ramp force component 73, generated by the integrator 72 and the hysteresis switch 69, are added to the compensator signal 31 at summation point 79 to obtain the control signal 32 which is input to the actuator 55. Because the ramp force component 73 will continue to increase in the desired direction, the control signal 32 will eventually have too much current and cause the actuator to slightly overshoot the desired steady state location.

Once the actuator passes the desired steady state location, the sign of the error signal 42 changes. At that time, the sign of the output of the hysteresis switches 65 and 69 also change. Consequently, the constant force component 66 and the ramp force 73 will be exerted in the opposite direction as before. Once again, the magnitude of the ramp force 73 will continue to increase until the actuator has slightly overshot the desired location. At that time, the force components 66 and 73 will change direction again.

The actuator oscillation about a desired location will continue indefinitely in a limited band sometimes characterized by the term limit cycle. Because of the hysteresis switch ability to almost instantaneously change the direction of their output current, however, the actuator will be able to have a small to negligible limit cycle.

The ramp force 73 also has the added benefit of compensating for any offsets that may be present in the system. Offsets are errors present in the system due to changes in gain, static state forces, or other causes. The effect of offsets is that the system will need more current than the system model predicts it needs. Therefore, the compensator signal 31 will not be adequate to drive the actuator (if one were to ignore the effects of friction). The ramp force 73 is capable of providing this extra current without adversely affecting system performance. If there is an offset error present in the system, the sign of the error signal 42 will not change until the offset error has been overcome.

Referring to FIG. 6, the performance of the disturbance estimator and controller according to the invention can be improved by incorporating certain linear elements to complement the described non-linear design. FIG. 6 depicts the invention according to FIG. 5 with two additional linear elements. The two additional linear elements allow the estimator and controller to compensate for very large error signals that are not necessarily due to disturbances, e.g., when the actuator is commanded to go from one extreme position to another extreme position.

It will be seen that FIG. 6 is similar to FIG. 5, and that similar components are located in similar positions. The gain blocks in FIG. 6 however include not only the general designator K (with its appropriate subscript), but also the factors which go to make up that gain. One skilled in the art will appreciate by the detailed notation of the factors within each of the gain blocks how one goes about determining the particular gains in a particular system. It will be seen, as described in general above, and with the gains thus defined as in FIG. 6, one skilled in the art will be able to configure a control system as described and claimed herein.

With respect to the differences between the preferred system of FIG. 6 and the FIG. 5 implementation, a linear signal component 68 is added to the input of the integrator 72. The error signal 42 is multiplied by the gains $K_{e1}$ and $K_d$ to produce a signal 68. The signal 68 is added to the output 62 of the hysteresis switch 69 at summation point 70 to obtain the signal 71, which is input to the integrator 72.

The gain $K_{e1}$ is the same as was described in connection with FIG. 5. Kd is determined by state space or classical techniques that are well known to those with ordinary skill in the art. When the error signal is small, the signal 68 will not contribute significantly to the rate of integration of the integrator 72 because the output of the hysteresis switch 69 will be much larger than the signal 68. When the error signal is large, however, the signal 68 will help the integrator 72 to integrate faster.

The second modification from the FIG. 5 implementation is the addition of a third force component on line 67 to the output 73 of the integrator 72. The third force component on line 67 is a linear force and is generated by multiplying the error signal 42 by gains $K_{e2}$ and $K_d$. The gains $K_{e2}$ and $K_d$ are the same as described earlier. The third force component on line 67 will be small and not very significant when the error signal 42 is small. When the error signal 42 is large, however, the third force component will help to push the actuator to the desired location. The constants $K_{e2}$ and $K_d$ are determined such that the sum of the first force component and the third force component is less than the actual disturbance present in the system.

The third force component 67 is added to the output 73 of the integrator 72 at summation point 75 to generate the signal 77. It is this new signal 77 that is added to the constant force component 66 and the compensator signal 31 at summation point 79 to generate the control signal 32. Alternatively, the third force component can be added to the first force component 66, the second force component 73, and the compensator signal 31 directly at summation point 79. By adding the two linear elements represented by the linear signal 68 and the third force component 67, the disturbance estimator and controller of the invention can better respond to a wide range of error signal magnitudes. The hysteresis switches 69 and 65 enable the invention to rapidly overcome friction forces when the error signal is very small (e.g., when the actuator is maintaining a small limit cycle about a desired steady state location), and the linear signals 67 and 68 allow the invention to rapidly reduce a very large error signal (e.g., when the actuator is commanded to move from one extreme position to another).

The implementation of FIG. 6 can be considered a basic linear controller on which a non-linear disturbance estimator and integrator is overlaid. While the linear components might be eliminated, if desirable, they illustrate certain benefits of the invention. For example, when a basic controller design originates from linear considerations, it is possible to overlay a non-linear disturbance estimator and controller on those linear elements, and have the two operate together. The elements can then be separated, when desired, and analyzed separately. For example, if trouble shooting is needed, it is possible to disable the non-linear disturbance estimator and to revert to the linear control for debugging purposes. When the control is appropriately debugged, the non-linear disturbance estimator and controller can be again overlaid to achieve the benefits of the invention. The use of the overlaid non-linear components with a very robust and stable linear controller render the development of the controller quite easy in comparison to the classical approach. The overlay of the non-linear disturbance estimator and controller achieve more precise operation. And the linear components do participate in the overall operation when large movements are required. The non-linear elements do not allow the control to become slow when the error is small. The best of both systems is thereby achieved.

It will now be apparent that what has been provided is a new form of feedback control. A state model is provided which can be very simple in construction. A basic controller, which can be linear if desired, drives both the plant (the actuator) and the state model. An output of the state model is compared with a corresponding feedback signal from the plant to generate an error signal. The error signal is sensed by the disturbance estimator to actuate a disturbance controller in the presence of a disturbance to impose a non-linear correction on the system to accommodate for the disturbance. The control is relatively simple in design yet produces highly desirable control characteristics.

What is claimed is:

1. A control system for a plant subject to non-linear disturbances, comprising:

a controller responsive to an external command signal and a first feedback control signal for generating a first controller output signal;

a model responsive to said first controller output signal for emulating plant response to said first controller output signal, said model generating said first feedback signal indicative of plant response as a result thereof;

first means for comparing actual plant response with said first feedback signal, said first means generating said first error signal thereby;

a disturbance estimator responsive to said first error signal for generating a first output compensation signal calculated to approximate the correction for non-linear disturbances; and second means for summing said first controller output signal and said first output compensation signal, said second means generating a compensated plant command signal for driving the plant in accordance therewith.

2. The system of claim 1, further comprising a third means for scaling said first controller output signal prior to said summation performed by said second means.

3. The system of claim 1, wherein said model adjusts said first feedback signal in response to said first error signal.

4. The system of claim 1, wherein said model comprises a state model of the plant.

5. The system of claim 1, wherein said disturbance estimator comprises a first hysteresis switch configured to input said first error signal, said first hysteresis switch generating a disturbance control signal of a predetermined magnitude in response to a polarity of said first error signal.

6. The system of claim 5, wherein said first hysteresis switch changes a polarity of said disturbance control signal in response to a change in said polarity of said first error signal.

7. The system of claim 5, wherein said predetermined magnitude of said disturbance control signal is independent of a magnitude of said first error signal.

8. The system of claim 5, wherein said predetermined magnitude of said disturbance control signal is insufficient to overcome effects of the non-linear disturbances.

9. The system of claim 5, wherein said disturbance estimator further comprises a second hysteresis switch configured to input said first error signal, said second hysteresis switch generating an output signal in response to a polarity of said first error signal, a first integrator responsive to said output signal for generating a ramp signal, and summation means responsive to said disturbance control signal and said ramp signal for producing said first output compensation signal.

10. The system of claim 9, wherein said second hysteresis switch changes a polarity of said output signal in response to a change in said polarity of said first error signal.

11. The system of claim 9, wherein said ramp signal has a predetermined slope.

12. A method of controlling a plant subject to non-linear disturbances, comprising the steps of:

generating a plant control command;

modeling a state of the plant in response to said plant control command;

adjusting said plant control command in response to said modeled state of the plant;

commanding a state of the plant with said adjusted plant control command;

comparing said state of the plant with said modeled state of the plant to generate an error signal;

calculating an estimated disturbance compensation signal in response to said error signal to approximate for said non-linear disturbance;

adjusting said adjusted plant control command in response to said estimated disturbance compensation signal.

13. The method of claim 12, further comprising the step of modeling a state of the plant in response to said adjusted plant control signal and in response to said error signal.

14. The method of claim 12, wherein said step of calculating an estimated disturbance compensation signal in response to said error signal comprises the steps of:

generating a disturbance control signal of a predetermined magnitude and an output signal in response to a polarity of said error signal;

integrating said output signal to generate a ramp signal; and summing said disturbance control signal and said ramp signal to generate said estimated disturbance control signal.

15. The method of claim 14, wherein said step of generating a disturbance control signal of a predetermined magnitude and an output signal in response to a polarity of said error signal further comprises the step of changing a polarity of said disturbance control signal and said output signal in response to a change in said polarity of said error signal.

16. The method of claim 12, wherein said step of modeling a state of the plant in response to said plant control command comprises the steps of:

integrating said adjusted plant control command to produce a derivative estimate of said state of the plant;

adjusting said derivative estimate of said state of the plant in response to said error signal; and integrating said adjusted derivative estimate of said state of the plant to produce said modeled state of the plant.

17. An actuator positioning control system for a plant subject to non-linear frictional disturbances, comprising:

a controller responsive to an external position command signal and a first feedback control signal for generating a first controller output signal;

a state model responsive to said first controller output signal for emulating actuator response in the absence of non-linear frictional forces to said first controller output signal, said state model generating said first feedback signal indicative of a modeled actuator state as a result thereof;

first means for comparing actual actuator response to said first controller output signal with said first feedback signal, said first means generating said first error signal thereby;

a non-linear disturbance estimator responsive to said first error signal for generating a first output compensation signal calculated to compensate for the non-linear frictional disturbances; and second means for summing said first controller output signal and said first output compensation signal, said second means generating a compensated actuator command signal for driving the actuator in accordance therewith.

18. The system of claim 17, wherein said state model further emulates actuator response to said first controller output signal in the presence of non-linear frictional forces, said state model being responsive to said first error signal thereby and adjusting said first feedback signal in response thereto.

19. The system of claim 17, wherein said state model comprises a second order state model of the actuator.

20. The system of claim 17, wherein said disturbance estimator comprises a first hysteresis switch configured to input said first error signal, said first hysteresis switch generating a disturbance control signal of a predetermined magnitude in response to a polarity of said first error signal.

21. The system of claim 20, wherein said first hysteresis switch changes a polarity of said disturbance control signal in response to a change in said polarity of said first error signal.

22. The system of claim 20, wherein said predetermined magnitude of said disturbance control signal is independent of a magnitude of said first error signal.

23. The system of claim 20, wherein said predetermined magnitude of said disturbance control signal is calculated to be less than a known force needed to overcome effects of the non-linear frictional disturbances.

24. The system of claim 20, wherein said disturbance estimator further comprises a second hysteresis switch configured to input said first error signal, said second hysteresis switch generating an output signal in response to a polarity of said first error signal, a first integrator responsive to said output signal for generating a ramp signal, and summation means responsive to said disturbance control signal and said ramp signal for producing said first output compensation signal.

25. The system of claim 24, wherein said second hysteresis switch changes a polarity of said output signal in response to a change in said polarity of said first error signal.

26. The system of claim 24, wherein said ramp signal has a predetermined slope.

* * * * *